United States Patent [19]

Karnofsky et al.

[11] 4,288,297
[45] Sep. 8, 1981

[54] PROCESS FOR RECTIFICATION OF MISCELLA FROM EXTRACTION OF OLEAGINOUS SEEDS

[75] Inventors: George B. Karnofsky, Pittsburgh; John Slovski, Allison Park, both of Pa.

[73] Assignee: Dravo Corporation, Pittsburgh, Pa.

[21] Appl. No.: 140,151

[22] Filed: Apr. 14, 1980

Related U.S. Application Data

[63] Continuation of Ser. No. 745,397, Nov. 26, 1976, abandoned.

[51] Int. Cl.³ .............................................. B01D 3/14
[52] U.S. Cl. ...................................... 203/81; 203/98; 426/494
[58] Field of Search ........... 159/2 MS, DIG. 8, 47 R; 203/81, 98; 426/492-494, 656, 476, 430

[56] References Cited

U.S. PATENT DOCUMENTS

| | | | |
|---|---|---|---|
| 3,357,900 | 12/1967 | Snell | 159/2 MS |
| 3,884,767 | 5/1975 | Pottharst | 159/DIG. 8 |
| 3,966,982 | 6/1976 | Becker et al. | 426/430 |
| 3,993,535 | 11/1976 | Karnofsky | 426/430 |

Primary Examiner—Hiram Bernstein
Attorney, Agent, or Firm—Louis E. Marn; Elliot M. Olstein

[57] ABSTRACT

There is disclosed, for recovering an aqueous organic solvent in fractions of different concentrations from a miscella, a rectification and stripping process utilizing an evaporation system comprising evaporators, rectifiers and a stripping column wherein the liquid effluent from the evaporation system is stripped free of the organic component of the solvent.

8 Claims, 1 Drawing Figure

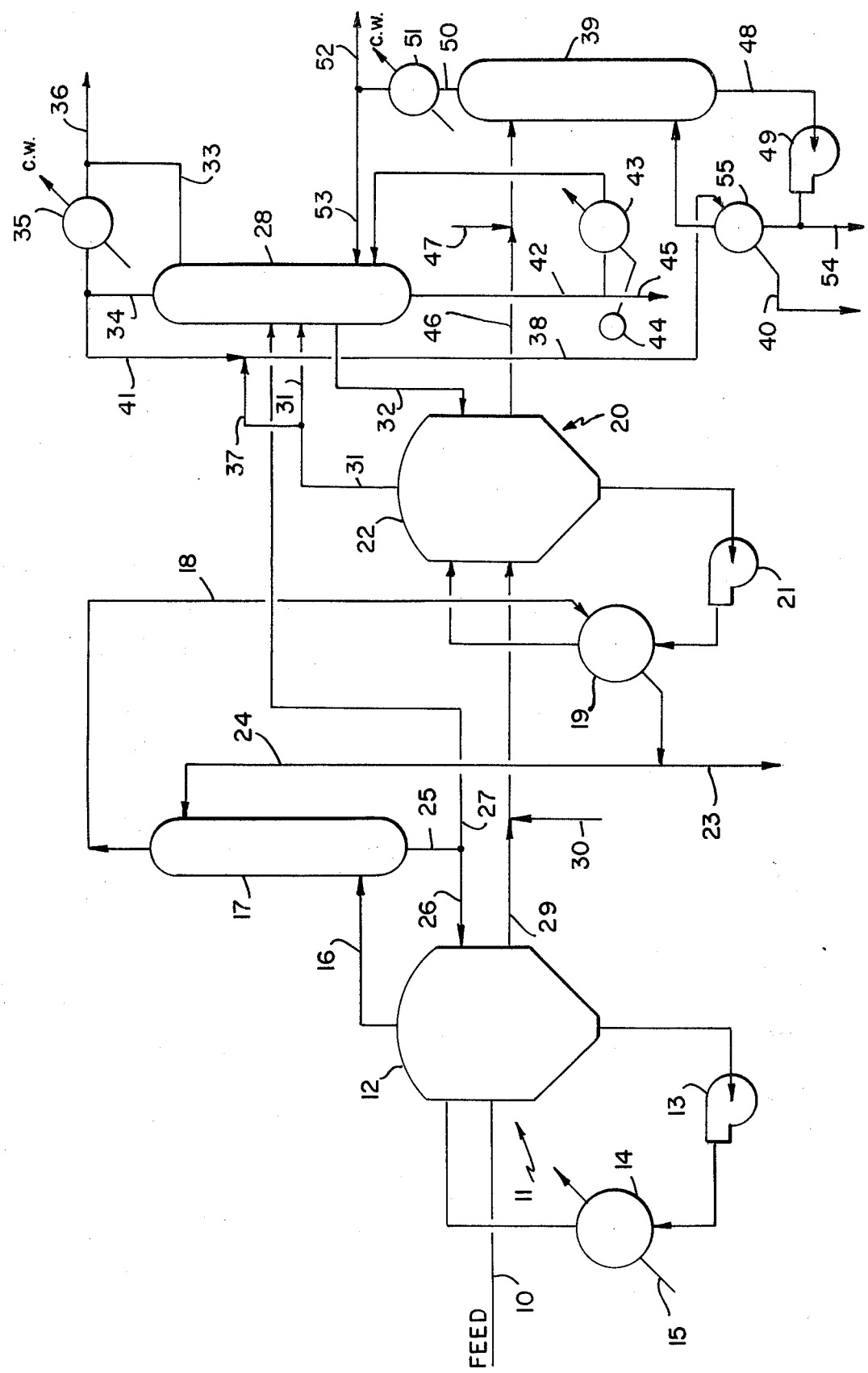

PROCESS FOR RECTIFICATION OF MISCELLA FROM EXTRACTION OF OLEAGINOUS SEEDS

This is a continuation, of application Ser. No. 745,397, filed Nov. 26, 1976, now abandoned.

BACKGROUND OF THE INVENTION

This invention relates to a rectification process by which an aqueous organic solvent is recovered in at least two fractions having different concentrations and the soluble component is recovered from the solution as an aqueous solution free of the organic component. More particularly, this invention is concerned with the recovery of aqueous alcohol solutions of at least two different alcohol concentrations, from a solution or miscella made by extracting carbohydrates and other components from soybeans or other oil seeds.

There is increasing commercial interest in the production of food products from soybeans that are suitable for human consumption. In conventional extraction of oil seeds, such as soybeans, with hexane for the production of animal feed the soybeans are flaked, extracted with hexane and the spent flakes cooked with moist heat (toasted). It has been long recognized that such a toasted product is not well suited for human consumption. The spent flakes prior to toasting are called white flakes, which when ground become the present soy flour of commerce. This too is not a product well suited for human consumption because it has an unpleasant beany taste and causes flatulence.

The major ingredients of hulled soybeans are protein, carbohydrates and sugars, glyceride oils, and numerous non-oil lipids, such as phosphatides. In present commercial practice in the manufacture of toasted meal and soy flour, only the oil and some of the phosphatides are extracted with hexane. The beany flavor of hexane extracted meal and flour is attributed to unextracted non-oil lipids. Flatulence is attributed to unextracted carbohydrates.

It is known that aqueous solutions of methanol, ethanol, and isopropranol in concentrations between 50 and 70% dissolve a substantial portion of the carbohydrates including those that cause flatulence. It is also known that soybean oil has a limited, but useful, solubility in strong alcohols, i.e., hot 95 volume percent ethanol, and that non-oil lipids are very soluble in aqueous alcohol solutions. When carbohydrates are extracted from full-fat flakes with 50 to 70% aqueous alcohol, we have found that almost all of the non-oil lipids are also extracted. We expect that these solubilities will become the basis for the commercial production of soybean products for human consumption.

There are numerous instances in the literature where relatively strong alcohol solutions used for extraction of soybeans are diluted in the process and need to be rectified for recovery of the strong alcohol for reuse. One of us in several applications assigned to the same assignee of the present invention has shown several cases where miscellas resulting from extraction of carbohydrates and other components have to be rectified for reuse.

In U.S. Letters Pat. No. 3,970,764, an alcohol vapor stronger in alcohol than the solvent used for extraction is used to increase the concentration of alcohol in the vapor recirculating in a vapor or flash desolventizer. As disclosed in co-pending application Ser. No. 549,434, now abandoned strong alcohol is advantageously used to displace relatively weak alcohol, prior to desolventizing, from spent flakes which have been extracted with weak alcohol. In the processes disclosed in U.S. Pat. Nos. 4,144,229 and 4,129,470, full-fat soybean flakes are treated successively with dilute and strong alcohols. These processes produce bland soy products which may be essentially free of glyceride oil, deleterious carbohydrates and non-oil lipids.

U.S. Pat. No. 3,993,533, assigned to the same assignee, discloses a distillation process suitable for recovering weak and strong alcohol solvents from a miscella containing whey (the extract containing carbohydrates and non-oil lipids and a minor amount of protein) while recovering whey as a concentrated aqueous solution stripped free of alcohol. In said process, the miscella flows through a series of rectification and stripping steps to obtain the desired result. Although said process meets the claims that by its practice the distillation can be carried out with the least expenditure of heat, it has been our experience that whey solutions often foam to the extent that they cannot be distilled in conventional distillation equipment. Herein is disclosed a new distillation process by which, with minimum additional heat as compared with the said process, the same result is accomplished and the foaming managed.

OBJECTS OF THE INVENTION

An object of the present invention is to provide a novel process for distilling miscella obtained by extracting oleaginous seed materials with solvent to recover the solvent.

Another object of the present invention is to provide a novel process for distilling miscella obtained by extracting with solvent to recover the solvent and a solvent-free aqueous solution of the soluble components.

Still another object of the present invention is to provide a novel process for distilling miscella obtained by extracting soybeans with aqueous alcohol solutions to recover those solutions.

A further object of the present invention is to provide a novel process for distilling miscella obtained by extracting soybeans with aqueous alcohol solutions to recover those alcohol solutions and an alcohol-free aqueous solution of the soluble components.

SUMMARY OF THE INVENTION

These and other objects of the present invention are achieved by passing miscella in series through one or more evaporators in which foaming can be handled by known means. Vapor from each evaporator, free of the components that cause foaming, is passed through a rectifying column. The almost completely evaporated miscella is then passed through a stripping column, at which point the volume of liquid is considerably reduced so that it is not unduly expensive to provide the oversized stripping column that is required to handle foam.

BRIEF DESCRIPTION OF THE DRAWING

A better understanding of the present invention as well as additional objects and advantages thereof will become apparent upon consideration of the detailed disclosure thereof when taken with the accompanying drawing illustrating a schematic flow diagram of the invention.

DETAILED DESCRIPTION OF THE INVENTION

In the hereinabove discussed extraction processes, the concentration of whey in the miscella to be distilled is in the range of 3 to 10%. In general, such a miscella needs to be separated into three fractions: a relatively strong alcohol solution as a condensate, a relatively dilute alcohol solution as a condensate, and a bottoms aqueous solution of whey that is practically free of alcohol.

Although some water is added to the solvent in the extraction and spent flakes desolventizing processes, either from dehydration of the soybean flakes or from direct steam used for stripping the spent flakes, this water is not generally sufficient to satisfy the requirement that the concentration of whey will not be excessive anywhere in the evaporation process. The whey solution becomes more viscous as it becomes concentrated. A possible but not mandatory limit of whey concentration is about 30% by weight of carbohydrates. Water may have to be added to the evaporating miscella to satisfy this requirement, optionally to be added only as required. This is illustrated in Examples 1 and 2 that follow.

Disposal of whey is a problem. In most disposal methods, it is desired that the alcohol-free whey solution leaving the distillation process be as concentrated in carbohydrate as feasible, say 30%. Where there is insufficient carbohydrate in the miscella to make a 30% solution in the bottoms, a suitable system must provide for recovery of the excess water free of alcohol. This is illustrated in Example 3 that follows.

The drawing is a schematic flow diagram of a multiple-effect rectification and stripping process of the present invention. Flow of vapor and liquid are cocurrent in a preferred mode of operation of the process, since relatively high boiling water low in alcohol is condensed at the low pressure end of the system which is preferably under vacuum. However, countercurrent flow may in some circumstances be advantageously used.

In the drawing, miscella to be distilled in line 10 is introduced into a 1st evaporator, generally indicated as 11, comprised of a vapor-liquid separator 12, a recirculating pump 13, and a heater 14, generally known as a forced circulation evaporator system. Steam for heating the 1st evaporator 11 is introduced through line 15 and condensed in heater 14. Vapor separated from the liquid in the vapor-liquid separator 12 is passed through line 16 to a rectifying column 17 adjacent the bottom thereof. The vapor is caused to pass in countercurrent contact to liquid reflux generated by condensing the vapor withdrawn from the rectifying column 17 by line 18 in a heater 19 of a 2nd evaporator, generally indicated as 20, which also includes a recirculating pump 21 and a vapor-liquid separator 22. In the rectifying column 17, dilute alcohol vapors are rectified so as to produce in line 23 strong alcohol (usually 92% by weight); the remainder of the condensate is refluxed to the rectifying column 17 through line 24. All, part or none of the liquid leaving the bottom of the rectifying column 17 in line 25 may be refluxed through line 26 to the vapor-liquid separator 12. All, part or none of the liquid leaving the bottom of the rectifying column 17 may be introduced through line 27 to a rectifying column 28 at a properly chosen location, as is hereinbelow discussed.

Partially concentrated miscella from the vapor-liquid separator 12 is passed by line 29 to the 2nd evaporator 20. Water in line 30 may be added to miscella in line 29. Part of the vapor separated in the vapor-liquid separator 22 is passed through line 31 to rectifying column 28 at a point below the point of entry of line 27. The remainder, if any, of the vapor from vapor-liquid separator 22 flows sequentially through lines 37 and 38, to the reboiler 55 of the stripping column 39 where the vapor is condensed. When necessary, liquid may be refluxed through line 32 to the 2nd evaporator 20 from a point in the rectifying column 28 adjacent the entry of line 31. Vapor flows upwardly in the rectifying column 28 countercurrent to reflux in line 33 generated by condensing vapor in line 34 from the rectifying column in condenser 35. The remainder of the condensate from condenser 35 is withdrawn from the system as strong alcohol in line 36. Condensate withdrawn from the reboiler in line 40 is one portion of the weak alcohol product. Alternatively, all of the vapor from the vapor-liquid separator 22 may be passed through line 31 to the rectifying column 28 and a portion of the vapor leaving the rectifying column 28 may be diverted through line 41 and thence through line 38 to the reboiler 55.

Liquid withdrawn from the bottom of the rectifying column 28 in line 42 is reboiled in a reboiler 43, if such is required. The boiler is heated by condensing steam in line 44. Net liquid flow from the bottom of rectifying column 28 which leaves the process through line 45 is part of the weak alcohol product.

Liquid from the vapor-liquid separator 22 flows through line 46 to a point near the top of the stripping column 39 in which it flows downwardly countercurrent to vapors generated by the reboiler 55. Stripped whey is withdrawn from the column 39 through line 48 by pump 49. Vapor in line 50 from the stripper column 39 is condensed in the stripper condenser 51. Condensate which leaves the process through line 52 is part of the weak alcohol product. all or none of the condensate may flow to the rectifying column 28 through line 53 at a point adjacent line 32. Stripped whey solution is withdrawn from the process as net bottoms in line 54 from the stripping column 39.

Location of the points of addition of the water that are required to prevent excessive carbohydrate concentrations will depend on the particular case. Proper location of the points of water addition will be demonstrated in the examples that follow.

Strong alcohol product is the sum of net condensates from the heater 19 in line 23, the condenser 35 in line 36 and optionally the condensate from the stripper reboiler 38 in line 40. Weak alcohol product is the sum of net liquid from the bottom of the rectifying column 28 or its reboiler in line 45, stripper condensate in line 52 and optionally condensate from the reboiler 38 in line 40.

In the following examples, the flows in the various lines were chosen according to the following criteria already discussed:
1. Heat consumption is as low as is practical.
2. Carbohydrate concentration does not exceed 30% by weight anywhere in the process and in every case is 30% in the whey solution exiting in line 54.
3. The stripping column is the only distillation column through which the miscella flows. Flow of partially concentrated miscella to the stripping column is minimal to minimize foaming.

As will become apparent from the example that follow, heat consumption per pound of miscella fed to the distillation system depends primarily on the fraction of the miscella to be recovered as strong alcohol. As the fraction increases, reflux to the separator 12 through line 26 is required; next, reflux to the separator 22 through line 32; and finally the addition of the reboiler 43. Also, as the fraction increases, the vapor in line 38 that is condensed in stripper-reboiler 55 increases in concentration.

The following examples are illustrative:

EXAMPLE 1

The miscella to be distilled resulted from the extraction process and the example disclosed in U.S. Pat. No. 4,129,470. This is a 4-step process in which soybean flakes are treated successively with dilute and strong alcohol to produce soy protein concentrate. Per 100 pounds of flakes fed, 170 pounds of strong (92 wt.%) aqueous ethanol entered the extractor at the flakes exit end. Of these 170 pounds, 58.3 exited with the flakes and 1.7 pounds exited with an oil phase which was removed at an intermediate point in the extractor. At another intermediate point in the extraction process, 230 pounds of 45.9% ethanol were added to the solvent stream. The carbohydrate miscella leaving at the flakes entrance to the extractor amounted to 370 pounds, and consisted of 5% whey (4.2% carbohydrates plus 0.8% lipids) dissolved in 56 wt.% aqueous ethanol. This solution was separated by the distillation process of this invention to recover 230 pounds of 45.9 wt.% ethanol, 110.0 pounds (170 minus 58.3 minus 1.7) of 92 wt.% ethanol and a solution, substantially alcohol-free, of whey in water. The flow in each line is summarized in Table 1.

The feed miscella had in it only 11 pounds of water in excess of that in the extraction solvents to be recovered. Consequently, it was necessary to add water in line 30 to the partly concentrated miscella in line 29 and to add water in line 47 to the further concentrated miscella in line 46 to hold the carbohydrate concentration to a maximum of 30%. This maximum was arbitrarily imposed to avoid handling viscous solutions. Any suitable maximum concentration may be used; this disclosure is not limited to 30%.

Since in this case there was ample boil up from evaporation of the miscella to provide the reflux in the rectifying columns 17 and 28, there was no need to reflux liquid from the rectifying column 17 to the vapor liquid separator 12. Flow in line 26 was zero. Likewise, flow in lines 32, 53 and 41 were zero; and the reboiler 43 was omitted.

Strong (92% alcohol) was recovered in lines 23 and 36. The sum of the flows in these lines were 110 pounds (42.6+67.4). Weak alcohol was recovered in lines 40, 45 and 52. The sum of the flows in these lines were 230 pounds (13.8+207.7+8.5).

EXAMPLE 3

The miscella to be distilled resulted from an extraction process and the example of it disclosed in copending application Ser. No. P/2740 CIP. This is a 4-step process in which soybean flakes are treated successively with dilute and strong alcohol to produce a soy flour. The process differs from that of Example 1 in that the ratio of strong to dilute alcohol is greater. Consequently, this example demonstrates how the process of this invention is applied where the vapor resulting from miscella evaporation is insufficient to provide the reflux that is required to make strong alcohol.

In the extraction process which provided the miscella for this example, per 100 pounds of flakes fed, 150 pounds of strong (92 wt.%) aqueous alcohol entered the extractor at the flakes exit end. Of these 150 pounds, 58.3 exited with the flakes, and 1.7 pounds exited with an oil phase which was removed at an intermediate point in the extractor. At another intermediate point, 50 pounds of 8 wt.% ethanol were added to the solvent stream. The carbohydrate miscella leaving at the flakes entrance to the extractor amounted to 160 pounds, and consisted of 8% whey (6% carbohydrates plus 2% lipids) dissolved in 59 wt.% aqueous ethanol. This solution was separated by the distillation process of this invention to recover 50 pounds of 8 wt.% ethanol, 90 pounds of 92 wt.% ethanol, and a solution, substantially alcohol-free, of whey in water. The flow in each line is summarized in Table 1.

The feed miscella had in it only 7 pounds of water in excess of that in the extraction solvents to be recovered. Consequently, it was necessary to add water in line 30 to the partly concentrated miscella in line 29 and to add water in line 47 to the further concentrated miscella in line 46 to hold the carbohydrate concentration to a maximum of 30%.

Since in this case there was insufficient boil-up from evaporation of the miscella to provide the reflux in the rectifying columns 17 and 28, it was necessary to reflux liquid from the rectifying column 17 to the 1st evaporator 11 and from the rectifying column 28 to the 2nd evaporator 20. Flow in line 26 was 73.6 pounds; flow in line 32 was only 15.6 pounds. A portion of the vapor from the rectifying column 28 flowed through line 41 to be condensed in the reboiler 55. Flow in line 53 was zero; and the reboiler 43 was omitted.

Strong (92%) alcohol recovered in lines 23, 36 and 40 amounted to 90 pounds (45.1+15.1+29.8). Weak (8.0%) alcohol was recovered in lines 45 and 52, amounting to 50 pounds.

EXAMPLE 3

The miscella to be distilled resulted from an extraction process and the example of it disclosed in copending application Serial No. P/2740CIP. This is a 3-step process in which soybean flakes are treated countercurrently with strong alcohol to produce a soy flour. In this example, no dilute alcohol at all is used; the distillation system need only produce strong alcohol as distillate and an alcohol free aqueous solution as bottoms. Consequently, this example demonstrates how the process of the invention is applied where the vapor resulting from miscella evaporation is even less sufficient than it was in Example 2 for providing the reflux that is required to make strong alcohol.

In the extraction process which provided the miscella for the examples, per 100 pounds of flakes fed, 125 pounds of strong (92 wt.%) aqueous alcohol entered the extractor at the flakes exit end. Of these 125 pounds, 70 pounds exited with the flakes, and 1.7 pounds exited with an oil phase which was removed at an intermediate point in the extractor. The miscella leaving at the flakes entrance end contained some oil, some carbohydrates, the non-oil lipids and the water extracted from the flakes. The miscella amounted to 69.0 pounds, and consisted of 8.3% of whey (1.5% carbohydrates and 6.8% lipids) dissolved in 77% aqueous ethanol. This solution was separated by the distillation process of this invention to recover 53.3 pounds of 92 wt.% ethanol, 3.0 pounds of distilled water in line 45 and 12.7 pounds of alcohol free whey solution in line 54.

The feed miscella had in it only 1 pound of carbohydrate and 8 pounds of water in addition to the aqueous alcohol solvent to be recovered. Since whey is difficult to dispose of, and may have to be dried, it is desirable that it be recovered in as strong an aqueous solution as possible, say 30% based on carbohydrate. Consequently, it was necessary in this case to substract substantially alcohol-free water from the whey by the process, instead of adding it as in Examples 1 and 2.

To provide adequate reflux for rectifying the alcohol, it was necessary not only to reflux liquid from the rectifying column 17 to the 1st evaporator 11 through line 26 and to reflux liquid from the rectifying column 28 to the 2nd evaporator 20 through line 32, but also to provide the reboiler 43. Since strong alcohol was the only product, all of the distillate from stripping column 39 was passed by a pump (not shown) through line 53 to the rectifying column 28.

Strong (92 wt.%) alcohol was recovered in lines 23, 36 and 40. The sum of the flows in these lines was 53.3 pounds (25.8 + 14.8 + 12.7).

that the invention is not limited to two evaporators, since one or more than two may be used. It will also be understood that flow of vapor and liquid in multiple-effect can be countercurrent.

It will also be understood that the reboiler 55 may be omitted, and that in its place live steam may be supplied to the bottom of the stripping column 39. Although such a substitution will increase the heat consumption of the process, the increase will not be great, and the substitution may be deemed practically advantageous.

While the invention has been described in connection with a preferred embodiment thereof, it will be understood that many modifications will be readily apparent and that this application is intended to cover any adaptations and variations thereof. Therefore, it is manifestly intended that this invention be only limited by the claims and the equivalents thereof.

We claim:

1. A process for distilling a miscella including dissolved carbohydrates obtained by extracting oleaginous seed material with alcohol solutions to recover a dilute alcohol solution and a concentrated alcohol solution while minimizing foaming which comprises:

TABLE 1

| LINE OR APPARATUS DESIGNATION | EXAMPLE 1 | | | EXAMPLE 2 | | | EXAMPLE 3 | | |
|---|---|---|---|---|---|---|---|---|---|
| | FLOW LBS. | WT% ETOH | WT %* CARBO-HYDRATE | FLOW LBS. | WT % ETOH | WT %* CARBO-HYDRATE | FLOW LBS. | WT % ETOH | WT %* CARBO-HYDRATE |
| 10 | 370.0 | 56 | 5.0 | 160 | 59 | 6.0 | 69.0 | 71.0 | 3.2 |
| 15 | 107.0 | 0 | — | 66 | 0 | — | 37.6 | 0 | — |
| 16 | 156.5 | 74 | — | 118.7 | 73 | — | 76.5 | 83 | — |
| 23 | 42.6 | 92 | — | 45.1 | 92 | — | 25.8 | 92 | — |
| 24 | 201.0 | 92 | — | 105.2 | 92 | — | 59.9 | 92 | — |
| 26 | 0 | — | — | 73.6 | 61 | — | 50.7 | 47 | — |
| 27 | 113.9 | 67 | — | 0 | — | — | 0 | — | — |
| 29 | 213.5 | 38 | 8.7 | 114.9 | 39 | 8.5 | 43.2 | 58 | 4.7 |
| 30 | 15.7 | 0 | — | 1.6 | 0 | — | 0 | — | — |
| 31 | 159.2 | 45 | — | 96 | 45 | — | 71.5 | 75 | — |
| 32 | 0 | — | — | 15.6 | 8 | — | 41.1 | 69 | — |
| 33 | 157.3 | 92 | — | 105.2 | 92 | — | 79.4 | 92 | — |
| 36 | 67.4 | 92 | — | 15.1 | 92 | — | 14.8 | 92 | — |
| 37 | 13.8 | 45 | — | 0 | — | — | 0 | — | — |
| 38 | 13.8 | 45 | — | 29.8 | 92 | — | 12.7 | 92 | — |
| 40 | 13.8 | 45 | — | 29.8 | 92 | — | 12.7 | 92 | — |
| 41 | 0 | — | — | 29.8 | 92 | — | 12.7 | 92 | — |
| 43 | No | | | No | | | Yes | | |
| 44 | 0 | — | — | 0 | — | — | 12.6 | — | — |
| 45 | 207.7 | 45 | — | 35.5 | 8 | — | 3.0 | 0.001 | — |
| 46 | 58.9 | 5 | 30 | 36.1 | 7.8 | 30 | 23.1 | 39 | 12.3 |
| 47 | 8.5 | 0 | — | 14.3 | 0 | — | 0 | — | — |
| 52 | 8.5 | 31 | — | 14.5 | 8 | — | 0 | — | — |
| 53 | 0 | — | — | 0 | — | — | 10.4 | 76 | — |
| 54 | 58.9 | 0.001 | 30 | 35.9 | 0.001 | 30 | 127 | 0.001 | 30 |

*Lipid-Free Basis

The invention has been illustrated by a process employing two evaporator-still combinations followed by a stripper. Multiple-effect vapor flow is concurrent with liquid flow. Operating pressures decrease from that in the 1st evaporator 11 and its rectifier 17 to that in 2nd evaporator 20 and its rectifier 28 to that in the stripping column 39. In the above examples, pressures in the evaporator-rectifiers and stripping column 39 were respectively 32 psig, 3 psig, and 310 mm Hg absolute. It will be understood by those skilled in the art that the pressure in the stripping column had to be high enough so that vapor from the stripping column could be condensed with cooling water, and that the pressures in the evaporators were such as to provide temperature differences adequate for heat transfer in the reboiler 19 and in the stripper reboiler 38. It will also be understood that heat interchangers not shown in the drawing may be used in the commercial practice of this invention, and (a) introducing said miscella into a first vapor/liquid separation;

(b) withdrawing and heating a liquid stream from said first vapor/liquid separation zone and introducing said heated liquid stream into said vapor/liquid separation zone;

(c) withdrawing a vapor stream from said first vapor/liquid separation zone and introducing said vapor stream into a first rectification zone;

(d) contacting said vapor stream of step (c) in said first rectification zone with a liquid stream to separate a lower boiling component from said liquid stream;

(e) withdrawing a vapor stream from said first rectification zone;

(f) condensing said vapor stream of step (e) to form a condensate;

(g) passing a portion of said condensate to said rectification zone as said liquid stream of step (d);

(h) recovering a remaining portion of said condensate as a concentrated alcohol solution;

(i) withdrawing a net liquid stream from said first vapor/liquid separation zone and introducing said net liquid stream into a second vapor/liquid separation zone;

(j) withdrawing and heating a liquid stream from said second vapor/liquid separation zone and introducing said heated liquid stream into said second vapor/liquid separation zone;

(k) withdrawing a vapor stream from said second vapor/liquid separation zone and introducing a portion of said vapor stream into a second rectification zone;

(l) contacting said vapor stream of step (k) in said second rectification zone with a liquid stream to separate a lower boiling component of said liquid stream;

(m) withdrawing and condensing a vapor stream from said second rectification zone to form a condensate of concentrate alcohol solution;

(n) withdrawing a net liquid stream from said second vapor/liquid separation zone and introducing said net liquid stream from said second vapor/liquid separation zone into a stripping zone;

(o) contacting said net liquid stream in said stripping zone with a vapor stream to separate a lower boiling component from said liquid stream;

(p) withdrawing and condensing a vapor stream from said stripping zone as said dilute aqueous alcohol solution; and (q) withdrawing a liquid bottom stream from said stripping zone, said liquid bottom stream containing said carbohydrates in a concentration of no more than 30 percent by weight.

2. The process as defined in claim 1 wherein a portion of the vapor stream withdrawn from said second vapor/liquid separation zone is condensed to provide heat for generating said vapor stream of step (o), the resulting condensate constituting a dilute alcohol solution.

3. The process as defined in claim 1 wherein water is added to said liquid streams withdrawn from said vapor/liquid separation zones to maintain a concentration of carbohydrates of not more than 30% in said liquid bottom stream of step (q).

4. The process as defined in claim 1 wherein a liquid stream is withdrawn from said second rectification zone and is passed to said second vapor/liquid separation zone.

5. The process as defined in claim 1 wherein a portion of the vapor stream withdrawn from said second rectification zone is condensed to provide heat for generating said vapor stream of step (o).

6. A process for distilling miscella including dissolved carbohydrates obtained by extracting oleaginous seed material with concentrated alcohol solutions to recover concentrated alcohol solutions while minimizing foaming, which comprises:

(a) introducing said miscella into a first vapor/liquid separation zone;

(b) withdrawing said heating a liquid stream from said first vapor/liquid separation zone and introducing said heated liquid stream into said first vapor/liquid separation zone;

(c) withdrawing a vapor stream from said first vapor/liquid separation zone and introducing said vapor stream into a first rectification zone;

(d) contacting said vapor stream of step (c) in said first rectification zone with a liquid stream to separate a lower boiling component from said liquid stream;

(e) withdrawing a vapor stream from said first rectification zone;

(f) condensing said vapor stream of step (e) to form a condensate;

(g) passing a portion of said condensate to said first rectification zone as said liquid stream of step (d);

(h) recovering a remaining portion of said condensate as a concentrated alcohol solution;

(i) withdrawing and passing a liquid stream from said first rectification zone to said first vapor/liquid separation zone;

(j) withdrawing a net liquid stream from said first vapor/liquid separation zone and introducing said net liquid stream into a second vapor/liquid separation zone;

(k) withdrawing and heating a liquid stream from said second vapor/liquid separation zone and introducing said heated liquid stream into said second vapor/liquid separation zone;

(l) withdrawing a vapor stream from said second vapor/liquid separation zone and introducing a portion of said vapor stream into a second rectification zone;

(m) contacting said vapor stream of step (l) in said second rectification zone with a liquid stream to separate a lower boiling component from said liquid stream;

(n) withdrawing and condensing a vapor stream from said second rectification zone to form a condensate of concentrate alcohol solution;

(o) withdrawing and passing a liquid stream from said second rectification zone to said second vapor/liquid separation zone;

(p) withdrawing a net liquid stream from said second vapor/liquid separation zone and introducing said net liquid stream from said second vapor/liquid separation zone into a stripping zone;

(q) contacting said net liquid stream from said stripping zone with a vapor stream to separate a lower boiling component from said liquid stream;

(r) withdrawing and heating a liquid stream from said stripping zone to provide said vapor stream of step (q);

(s) withdrawing and passing a vapor stream from said stripping zone to said second rectification zone; and (t) withdrawing a liquid bottom stream from said stripping zone, said liquid bottom stream containing said carbohydrates in a concentration of no more than 30 percent by weight.

7. The process as defined in claim 6 wherein a liquid stream is withdrawn from said second rectification zone and a portion thereof is heated to provide a portion of the vapors for said second rectification zone.

8. The process as defined in claim 6 wherein said oleaginous seed material is soybeans.

* * * * *

UNITED STATES PATENT AND TRADEMARK OFFICE
CERTIFICATE OF CORRECTION

PATENT NO. : 4,288,297
DATED : SEPTEMBER 8, 1981
INVENTOR(S) : GEORGE B. KARNOFSKY and JOHN SLOVSKI It is certified that error appears in the above-identified patent and that said Letters Patent is hereby corrected as shown below:

Col. 2, line 9, before "Pat." insert -- Letters --;
Col. 5, line 13, before "Pat." insert -- Letters --;
line 56, correct "EXAMPLE 3" to -- EXAMPLE 2 --;

In the Claims:

Col. 9, line 65, "said" should be -- and --

Signed and Sealed this

Twenty-first Day of February 1984

[SEAL]

Attest:

GERALD J. MOSSINGHOFF

Attesting Officer    Commissioner of Patents and Trademarks